United States Patent
Hoek et al.

(10) Patent No.: US 7,855,234 B2
(45) Date of Patent: Dec. 21, 2010

(54) FISCHER-TROPSCH PROCESS AND REACTOR ASSEMBLY

(75) Inventors: Arend Hoek, Amsterdam (NL); Hans Michiel Huisman, Rotterdam (NL)

(73) Assignee: Shell Oil Company, Houston, TX (US)

( * ) Notice: Subject to any disclaimer, the term of this patent is extended or adjusted under 35 U.S.C. 154(b) by 387 days.

(21) Appl. No.: 11/988,970

(22) PCT Filed: Jul. 14, 2006

(86) PCT No.: PCT/EP2006/064279

§ 371 (c)(1), (2), (4) Date: Feb. 19, 2008

(87) PCT Pub. No.: WO2007/009955

PCT Pub. Date: Jan. 25, 2007

(65) Prior Publication Data

US 2009/0124711 A1    May 14, 2009

(30) Foreign Application Priority Data

Jul. 20, 2005    (EP) .................................. 05254509

(51) Int. Cl.
C07C 27/00    (2006.01)

(52) U.S. Cl. ...................................... 518/700; 518/706
(58) Field of Classification Search ................ 518/700, 518/706

See application file for complete search history.

(56) References Cited

U.S. PATENT DOCUMENTS 2,610,976 A    9/1952    Homer et al. ............ 260/449.6

FOREIGN PATENT DOCUMENTS

| EP | 414555 | 2/1991 |
|---|---|---|
| EP | 823470 | 2/1998 |
| WO | WO2004004884 | 1/2004 |

*Primary Examiner*—Jafar Parsa

(57) ABSTRACT

A method of accommodating a reduction in production capacity of one or more reactors in a multi-reactor assembly adapted for the production of hydrocarbon products from syngas, the syngas being provided by a syngas manufacturing facility and provided to an entry stream system providing syngas to each of the reactors, and having an exit stream system taking at least hydrocarbon products from the reactors, wherein the method comprises the steps of: redistributing the syngas from the one or more said reactors to one or more other reactors, and increasing the temperature in the said one or more other reactors to at least partially take over the reduction in production capacity of the one or more reactors.

11 Claims, No Drawings

FISCHER-TROPSCH PROCESS AND REACTOR ASSEMBLY

The present application claims priority to European Patent Application 05254509.2 filed 20 Jul. 2005.

FIELD OF THE INVENTION

The present invention relates to a method of accommodating a reduction in the production capacity in a reactor-based process, particularly but not exclusively a Fischer-Tropsch process, and a multi-reactor assembly therefor. Another suitable process is alkylene oxidation, e.g. ethylene oxide preparation.

BACKGROUND OF THE INVENTION

Various processes are known for the conversion of gaseous hydrocarbonaceous feedstocks, especially methane from natural sources, for example natural gas, associated gas and/or coal bed methane, into liquid products, especially methanol and liquid and optionally solid hydrocarbons, particularly paraffinic hydrocarbons. At ambient temperature and pressure these hydrocarbons may be gaseous, liquid and (often) solid. Such processes are often required to be carried out in remote and/or offshore locations, where no direct use of the gas is possible. Transportation of gas, for example through a pipeline or in the form of liquefied natural gas, requires high capital expenditure or is simply not practical. This holds true even more in the case of relatively small gas production rates and/or fields. Re-injection of gas will add to the costs of oil production, and may, in the case of associated gas, result in undesired effects on crude oil production. Burning of associated gas has become an undesirable option in view of depletion of hydrocarbon sources and air pollution. A process often used for the conversion of carbonaceous feedstocks into liquid and/or solid hydrocarbons is the well-known Fischer Tropsch process.

For a general overview for the Fischer-Tropsch process reference is made to Fischer-Tropsch Technology, Studies in Surface Science and Catalysis, Vol. 152, Steynberg and Dry (ed.) Elsevier, 2004, Amsterdam, 0-444-51354-X. Reference is further made to review articles in Kirk Othmer, Encyclopedia of Chem. Techn. and Ullmann's Encyclopedia of Ind. Chem.

The Fischer Tropsch process can be used for the conversion of hydrocarbonaceous feed stocks into liquid and/or solid hydrocarbons. The feed stock (for example natural gas, associated gas, coal-bed methane, (crude) oil fractions, biomass or coal) is converted in a first step into a mixture of hydrogen and carbon monoxide (this mixture is referred to as synthesis gas or syngas). The syngas is then converted in one or more steps over a suitable catalyst at elevated temperature and pressure into paraffinic compounds ranging from methane to high molecular weight molecules comprising up to 200 carbon atoms, or, under particular circumstances, even more.

The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, and especially comprises at least 60 v/v percent methane, preferably at least 75%, more preferably 90%. Very suitably natural gas or associates gas is used. Suitably, any sulphur in the feedstock is removed.

The hydrocarbons prepared are suitably $C_{3-200}$ hydrocarbons, more suitably $C_{4-150}$ hydrocarbons, and especially $C_{5-100}$ hydrocarbons, or mixtures thereof. These hydrocarbons or mixtures thereof are liquid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the catalyst and the process conditions used in the Fischer-Tropsch reaction, normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 85 wt % based on total hydrocarbons, usually between 50 and 75 wt %.

Numerous types of reactor systems have been developed for carrying out the Fischer Tropsch reaction. For example, Fischer Tropsch reactor systems include fixed bed reactors, especially multitubular fixed bed reactors, fluidised bed reactors, such as entrained fluidised bed reactors and fixed fluidised bed reactors, and slurry bed reactors such as three-phase slurry bubble columns and ebulated bed reactors.

In all types of reactors, there will be a reduction in the catalyst activity over time, generally due to catalyst deactivation. Generally, the activity of the catalyst can be restored by means of regeneration. However, even when applying regular regenerations, over a period of one year the catalyst may decrease by 10 to 90%, more often between 20 to 50%, based on CO-conversion to hydrocarbon products, and keeping all other conditions the same. For fixed-bed reactors, the reactor must be taken off-line for regeneration, and an in-situ treatment with hydrogen at elevated temperature and pressure, or, in the case of severe deactivation, a combination of hydrogen and oxygen treatments, will largely restore the initial activity. Occasionally the catalyst is regenerated ex-situ. After several regenerations however, the catalyst activity has dropped to a certain minimum level and new, fresh catalyst is loaded. In slurry reactors the catalyst may be regenerated in-situ or ex-situ, for instance by removing a certain fraction for a regeneration facility.

For all types of reactor, there will also always be occasions when it is desired to take the reactor off-line for repairs, maintenance, cleaning, etc. There will also be occasions when the reactor is not providing optimal running, and requires to be taken off-line for inspection and/or checking. There is also always the possibility of an accident leading to a sudden reduction, i.e. a reduction of the production of capacity of for instance 20 or 50% in a period of a few hours or even less, in the production capacity of a reactor, which requires it to continue the production at a lower level or requires it to be taken off-line for inspection and/or repair.

The production capacity of a reactor can also be reduced where the amount, i.e. volume, of catalyst is reduced, or the overall liquid volume is reduced. In one way, this could be the blocking of one or more tubes of a fixed bed reactor. In another way, this could be the reduction, for whatever reason, e.g. catalyst regeneration, of the amount of catalyst in a slurry bed reactor.

In general, there are a number of physical and chemical factors why there can be a reduction in the production capacity of a reactor. In many cases, the reduction may be a combination of such reasons. The reduction in production capacity could be one or a number of factors, due to sudden changes, or whose effect is only noticed suddenly despite gradual change. This invention deals especially with those situations in which one or more reactors need to be taken off-line.

Any reduction in production capacity of a reactor needs to be considered, especially in an integrated production facility, and more especially in a large integrated production facility.

Any time when a complete reactor is taken off-line results is a more serious reduction in the capacity of a multi-reactor assembly, at least when keeping all other parameters more or less the same.

However, syngas production is a highly optimised process which is generally carried out at a highly optimised rate of production. This can be seriously affected by any real or significant reduction in the production of the syngas, which would be the expected operation of any reduction in the reactor capacity and/or efficiency.

Further, many integrated processes, especially large integrated processes, have a utility balance. That is, the energy and/or chemical outputs of one or more parts of the overall facility are in co-ordination with the energy and/or output of one or more other parts. These include heat transfer between exothermic and endothermic processes, the use of recycle streams, balance of energy requirements based on expected output, distillation equipment, hydrogenation capacity, hydrocracking capacity as well as the use or reuse of non-commercial products. Many large industrial facilities require significant preparation and running to achieve the optimal utility balance, and the reduction in production capacity of a reactor can effect this utility balance, either directly or indirectly. In addition, in the case that on air separation unit is used, it is preferred to run this unit at its design capacity, rather than at a lower level.

Thus, it is generally desired to at least maintain the syngas production at its optimal level.

SUMMARY OF THE INVENTION

The present invention provides a method of accommodating a reduction in production capacity of one or more reactors in a multi-reactor assembly adapted for the production of hydrocarbon products from syngas, the syngas being provided by a syngas manufacturing facility and provided to an entry stream system providing syngas to each of the reactors, and having an exit stream system taking at least hydrocarbon products from the reactors, wherein the method comprises the steps of:

redistributing the syngas from the one or more said reactors to one or more other reactors, and increasing the temperature in the said one or more other said reactors to at least partially take over the reduction in production capacity of the one or more reactors.

Preferably, the production of syngas remains at the same level, so that the syngas entry stream system provides a regular input of syngas to the reactors. In case that a reduction would be necessary, the decrease is suitably at most 5%, preferably at most 3%, more preferably at most 1%.

In the ideal situation of maintaining same syngas production level, the more or less continuous syngas stream is redistributed over the remaining reactors, preferably in the same hydrogen/carbon monoxide ratios as before the decreased production capacity.

By increasing the reaction temperature in each non-affected reactor, the CO-conversion level is increased in said reactor(s) to at least partially take over the reduction in production capacity of the one or more affected reactors. The CO-conversion level is defined as the percentage of CO-molecules which is converted into $C_{1+}$ hydrocarbon products (paraffinic hydrocarbons including olefins and oxygenates, and excluding carbon dioxide).

Preferably the CO-conversion level over the total multi-reactor assembly is the same both before and after the reduction in production capacity. In the case that a reduction in CO-conversion level should be necessary, the reduction is at most 5%, preferably at most 3%, more preferably at most 1%. The ideal situation is the same CO-conversion level before and after the reduction in production capacity. It is observed that the reduction in production capacity usually occurs in a period of time of several days, often within two days, more often less than one day. In the case of taking out of production of a reactor this is usually within a few hours often within one hour, mostly in a few minutes.

It is admitted that the increase in temperature in the non-affected reactors will result in a lower $C_{5+}$ selectivity. However, as long as the temperature increase is less than about 40° C., preferably less than 30° C., the loss due to the decrease of $C_{5+}$ selectivity (or the increase of $C_{1-}$ $C_{4-}$ selectivity) is overcome by the increased hydrocarbon production due to increased CO-conversion. Preferably the increase in temperature of the reaction temperature is at most 20° C., preferably at most 15° C., more preferably 5-10° C.

DETAILED DESCRIPTION OF THE INVENTION

The present invention is applicable for use with a single stage or a multi-stage hydrocarbon production process, each stage having one or more reactors. Each reactor is individually operated, i.e. it has its own independent controls with respect to feed, temperature control etc. The pressure in all reactors will usually be about the same.

Preferably, the present invention is for use with two or more reactors operating in parallel in a first stage, preferably four or more reactors in a first stage, more preferably 8 or more reactors. In any following stage, the number of reactors is preferably 50% or less of the number of reactors in the previous stage, preferably less than 35%. Suitably the process is a three stage process, more preferably a two stage process.

In the case of a multi-stage reactor assembly, the temperature increase of the reactor(s) (in order to maintain more or less the same CO-conversion), could be any arrangement, including being distributed over more than one of the stages. Preferably any temperature increases over the several stages differ at most by 50%, preferably less than 35%, more preferably less than 20%.

Generally, the syngas entry stream system provides a regular input of syngas to the reactors, and the assembly produces a constant CO-conversion, and hence constant output of hydrocarbon products. Preferably, the method is such that the amount of syngas received by the assembly and/or the amount of product produced by the assembly is wholly or substantially constant.

The reduction in production capacity is suitably at most 35% of the steady state production of the reactor assembly, preferably at most 20%, more preferably at most 15%. The production capacity is defined as the weight production of C1+ hydrocarbon products, excluding carbon dioxide production. Naturally, the more reactors in the multi-reactor assembly, the less the percentage change in each reactor accepting redistributed syngas when one reactor is affected by a reduction in production capacity.

The present invention also provides a multi-reactor assembly for the production of hydrocarbon products from syngas, the assembly comprising at least two reactors, a syngas entry stream system and a hydrocarbon products exit system, wherein the assembly includes means to redistribute syngas from one or more reactors to one or more other reactors, and means to adjust the temperature in one or more of the other reactors, following any reduction in production capacity in one or more said reactors. Redistribution of gas stream can done by means well known in the art. For instance valves and mass flow restrictions means can be used. Temperature control of the reactor can be done by means of pressure control in the cooling system.

Thus, any reduction in the production capacity in one or more of the reactors, can be accommodated by re-distributing the syngas into at least one of the other reactors, and increasing the reactor temperature. Increasing the reactor temperature will allow such other reactors to accommodate the extra volume of syngas being supplied, while the original reactor(s) is inspected, and/or repaired and/or regenerated. Regeneration may be the 'ROR' process, correction of a fault, or replacing of the catalyst entirely.

The present invention also provides a process for the production of hydrocarbon products from syngas in at least two reactors, the reactors having an entry stream system providing syngas to each of the reactors, and an exit stream system taking at least hydrocarbon products from the reactors, wherein following a reduction in production capacity in one or more of the reactors, syngas is redistributed from the or each said reactors to one or more other reactors, and the temperature in one or more said other reactors is increased, in order to take over at least partially the reduction in production capacity of the one or more reactors, optionally followed by hydroconversion, e.g. hydrogenation, hydroisomerisation, hydrocracking and/or catalytic dewaxing, and distillation to obtain hydrocarbon products, e.g. LPG, naphtha, kerosene, gasoil, lube oil, detergent feedstock, drilling fluids and solvents.

The present invention provides a process, method, and/or assembly adapted to maintain use of a regular or steady supply of syngas in the light of any reduction in production capacity, e.g. physical capacity or chemical capacity, and/or efficiency of one or more reactors.

Reduction in capacity includes the complete halt, shut down or taking off-line of one or more reactors. Such reduction will generally be in the light of maintenance, repair and/or regeneration.

Reduction in efficiency could be similarly based on the need for maintenance, repair and/or regeneration, or the operation of a reactor at less than expected efficiency. This may not be "100%" efficiency, but the regular or expected efficiency level of a reactor.

The present invention also overcomes reduction of production capacity of a reactor where the amount, i.e. volume, of catalyst is reduced, or the overall liquid volume is reduced. As mentioned above, in one way, this could be the blocking of one or more tubes of a fixed bed reactor. In another way, this could be the reduction, for whatever reason, of the amount of catalyst in a slurry bed reactor.

In general, the present invention can also accommodate the various physical and chemical factors where there can be a reduction in the production capacity of a reactor. In many cases, the reduction may be a combination of such reasons. The reduction in production capacity could be one or a number of factors, which could also be sudden as well as gradual, or whose effect is only noticed suddenly despite gradual action.

Further, many integrated processes, especially large integrated processes, have a utility balance as described above. The present invention provides the ability to better maintain the balance of energy and/or chemical outputs of one or more parts of the facility are in co-ordination with the energy and/or output of one or more other parts. Many large industrial facilities require significant preparation and running to achieve the optimal utility balance, and maintaining this balance is a significant aim following any reduction in production capacity.

The process, method and assembly of the present invention could also involve some slight reduction in the syngas input volume, but it is intended that any reduction would not be significant and that syngas production would be maintained at a substantial level, generally above 90% and more preferably above 95% of the usual or 'standard' production level.

In a multi-reactor assembly, the requirement for some maintenance off-line, even for yearly maintenance, for each reactor, as well as other reasonably expectable off-line periods for regeneration of the catalyst, etc, may lead to a reduction in the production capacity of at least one reactor in the assembly for a significant proportion of time. Because of this, the present invention provides a process and method adapted to maintain high efficiency of the overall multi-reactor assembly, whilst maintaining optimal production of syngas.

The present invention is suitable for all types of reactor, including multi-tubular fixed-bed reactors, slurry-bed reactors, etc.

The present invention also provides a method of and apparatus for accommodating a reduction in production capacity of one or more reactors in a multi-reactor assembly adapted for other suitable reactor-based processes, such as methanol synthesis and the direct gasoline process.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. Reaction products which are liquid phase under reaction conditions may be separated and removed using suitable means, such as one or more filters. Internal or external filters, or a combination of both, may be employed. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

References to the Periodic Table and groups thereof used herein refer to the previous IUPAC version of the Periodic Table of Elements such as that described in the 68th Edition of the Handbook of Chemistry and Physics (CPC Press). The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to a three-phase slurry reactor at a molar ratio in the range from 0.4 to 2.5. Preferably, the hydrogen to carbon monoxide molar ration is in the range from 1.0 to 2.5, especially 1.4 to 2.0.

The gaseous hourly space velocity may very within wide ranges and is typically in the range from 500 to 10000 Nl/l/h, preferably in the range from 1500 to 4000 Nl/l/h.

In the present invention any reduction in syngas manufacture is suitably at most 50% of the reduction in sudden production capacity, preferably at most 25%, more preferably at most 10%. For instance in the case of a reduction in production capacity of 20%, the syngas production is reduced less than 20%, preferably less than 5%, more preferably less than 2%.

It will be appreciated that once the production capacity is available again, the changed conditions (redistribution of syngas, temperature increase) may be changed again into to original conditions.

The above described method may be used for the conversion of syngas into methanol or hydrocarbons. Another use in the oxidation of lower olefins, e.g. the catalytic conversion of ethylene into ethylene-oxide in a multitubular fixed bed reactor.

It will be understood that the skilled person is capable to select the most appropriate conditions for a specific reactor configuration and reaction regime.

What is claimed is:

1. A method of accommodating a reduction in production capacity of one or more reactors in a multi-reactor assembly adapted for the production of hydrocarbon products from syngas, the syngas being provided by a syngas manufacturing facility and provided to an entry stream system providing syngas to each of the reactors, and having an exit stream system taking at least hydrocarbon products from the reactors, wherein the method comprises the steps of:

redistributing the syngas from the one or more said reactors to one or more other reactors, and increasing the temperature in the said one or more other reactors to at least partially take over the reduction in production capacity of the one or more reactors.

2. A method as claimed in claim 1 for use with two or more reactors operating in parallel.

3. A method as claimed in claim 1 wherein the syngas entry stream system provides a constant input of syngas to the assembly of reactors.

4. A method as claimed in claim 1 wherein any reduction in the production of syngas by the syngas manufacturing facility is at most 5%.

5. A method as claimed in claim 1 wherein the assembly produces a constant output of hydrocarbon products or a method of accommodating a reduction in production capacity of one or more reactors in a multi-reactor assembly adapted for the production of hydrocarbon products from syngas, the syngas being provided by a syngas manufacturing facility and provided to an entry stream system providing syngas to each of the reactors, and having an exit stream system taking at least hydrocarbon products from the reactors, wherein the method comprises the steps of:

redistributing the syngas from the one or more said reactors to one or more other reactors, and increasing the temperature in the said one or more other reactors to at least partially take over the reduction in production capacity of the one or more reactors wherein the assembly produces a constant CO-conversion level.

6. A method as claimed in claim 5 wherein any reduction in the output of hydrocarbon products or CO-conversion level, or both, is at most 5%.

7. A method as claimed in claim 1 wherein the increase in temperature in said one or more other reactors is at most 20° C.

8. A method as claimed in claim 1 for use with a multi-stage hydrocarbon production process, the first stage having at least 3 reactors, and each subsequent stage has 50% or less of the number of reactors in the previous stage, and wherein the syngas is redistributed to the one or more other reactors within the same stage.

9. A method as claimed in claim 1 wherein the reduction in production capacity in the one or more reactors is at most 35% of the steady state production of the reactor assembly.

10. A process for the production of hydrocarbon products from syngas in a multi-reactor assembly having at least two reactors, the reactors having an entry stream system providing syngas to the reactors, and an exit stream system taking at least hydrocarbon products from the reactors, wherein following a reduction in production capacity in one or more of the reactors, syngas is redistributed from the one or more said reactors to one or more other reactors, and the temperature in the one or more said other reactors is increased to at least partially take over the reduction in production capacity of the one or more reactors.

11. A process for the production of hydrocarbon products as claimed in claim 10 further comprising hydroconversion and distillation to obtain hydrocarbon products.

* * * * *